United States Patent [19]
Yamamoto et al.

[11] Patent Number: 4,515,235
[45] Date of Patent: May 7, 1985

[54] DRIVERLESS GUIDED VEHICLE

[75] Inventors: Kiwamu Yamamoto; Tsuyoshi Tanaka, both of Tokyo, Japan

[73] Assignee: Shinko Electric Co., Ltd., Tokyo, Japan

[21] Appl. No.: 381,884

[22] Filed: May 25, 1982

[51] Int. Cl.³ .............................................. B62D 1/28
[52] U.S. Cl. ...................................... 180/168; 16/44
[58] Field of Search .................... 180/167, 168, 169; 280/120, 690, 696; 16/44, 31 R, DIG. 36

[56] References Cited

U.S. PATENT DOCUMENTS

| 408,595 | 8/1889 | Dion | 16/44 |
|---|---|---|---|
| 1,836,353 | 12/1931 | Withrow | 16/44 |
| 2,709,827 | 6/1955 | Volz | 16/44 |
| 3,482,644 | 12/1969 | Krieger | 180/168 |
| 4,040,527 | 8/1977 | Krieg | 180/168 |
| 4,083,575 | 4/1978 | Smith | 280/696 |
| 4,180,280 | 12/1979 | Doveri | 280/696 |
| 4,345,662 | 8/1982 | Deplante | 180/168 |

Primary Examiner—David M. Mitchell
Assistant Examiner—Joseph G. McCarthy
Attorney, Agent, or Firm—Cushman, Darby & Cushman

[57] ABSTRACT

A driverless guided vehicle movable along a guide path includes a wheel support device for supporting a wheel disposed in rolling engagement with a floor. The wheel support device is resiliently mounted on a body of the guided vehicle for vertical movement relative thereto. A detecting means for detecting the guide path and sensible markings along the guide path is fixedly secured to the wheel support device.

3 Claims, 9 Drawing Figures

DRIVERLESS GUIDED VEHICLE

BACKGROUND OF THE INVENTION

1. Field of the Invention

This invention relates to a driverless guided vehicle movable along a sensible guide path on a floor.

2. Prior Art

Generally, in order that all the wheels of a guided vehicle can be positively held in contact with a floor during the travelling of the guided vehicle, at least one of the wheels are mounted on a vehicle body through a spring. Conventionally, a detecting means, such as a detector for detecting the guide path or route and a detector for detecting sensible markings along the guide path, has been mounted on a vehicle body. FIG. 1 shows one conventional guided vehicle 1 which comprises a pair of drive wheels 2 disposed centrally of a body 3 and a pair of free wheels 4, 4 in the form of a caster disposed at the front and rear ends of the body 3, respectively. A detecting means 5 is attached to a lower portion of the front end face of the body 3. The two free wheels 4, 4 are mounted on the body 3 through respective spring means so that the drive wheels 2 can be positively held in contact with a floor 6 during the travelling of the guided vehicle 1 and that the guided vehicle 1 can be moved in a stable manner in forward and rearward directions along the guide path. With this construction, the body 3 is angularly moved or swung vertically about the drive wheels 2 during the travelling of the guided vehicle 1 under the influence of the spring means. As a result, the detecting means 5 is moved toward and away from the guide path and the sensible markings on the floor so that the sensitivity of the detecting means is adversely affected. Therefore, the operation of the guided vehicle 1 can not properly be controlled.

SUMMARY OF THE INVENTION

It is therefore an object of the invention to provide a driverless guided vehicle of the type in which a detecting means is not moved vertically relative to a floor during the travelling of the guided vehicle so that the detecting means can properly detect sensible guide path and markings.

According to the present invention, there is provided a driverless guided vehicle movable along a guide path on a floor which vehicle comprises a body; a wheel support device for supporting a wheel disposed in rolling engagement with the floor, the wheel support device being resiliently mounted on the body for vertical movement relative to the body; and a detecting means for detecting the guide path and sensible markings along the guide path, the detecting means being fixedly secured to said wheel support device.

DESCRIPTION OF THE PREFERRED EMBODIMENTS

Figure 1:
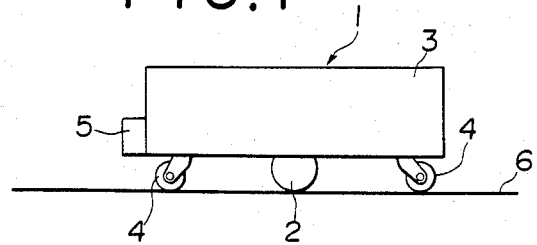
FIG. 1 is a schematic side-elevational view of a guided vehicle provided in accordance with the prior art.
Figure 2:
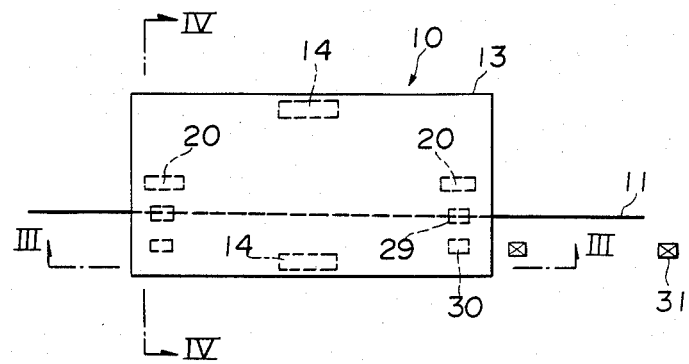
FIG. 2 is a schematic plan view of a guided vehicle provided in accordance with the present invention.
Figure 3:
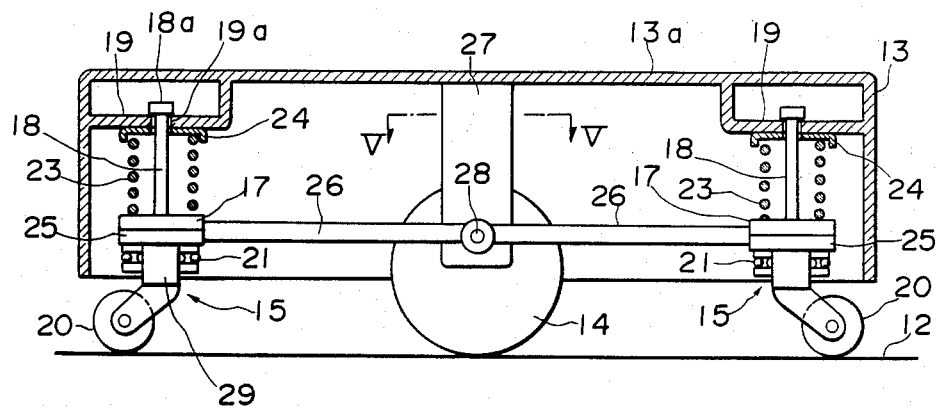
FIG. 3 is a cross-sectional view taken along the line III—III of FIG. 2.
Figure 4:
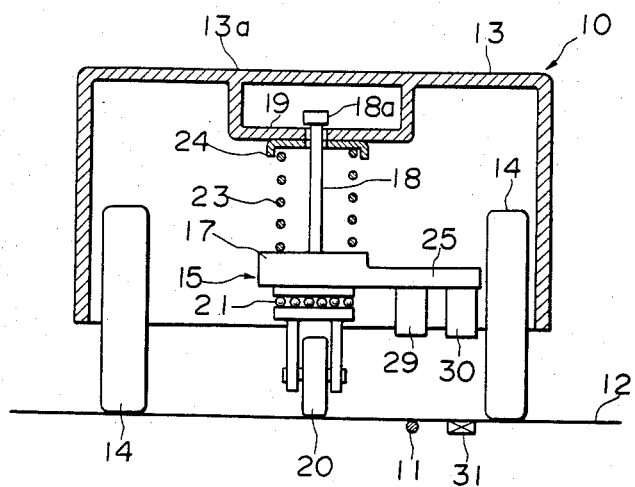
FIG. 4 is a cross-sectional view taken along the line IV–IV of FIG. 2.

FIGS. 2 to 4 show a driverless guided vehicle 10 movable along a predetermined guide path or route 11 on a horizontal floor 12 in a programmed manner, the guide path comprising an electrical wire which produces a magnetic field when energized. The guided vehicle 10 comprises a body 13 having a rectangular base portion 13a, and a pair of drive wheels 14 and 14 disposed centrally of the length of the body 13.

A pair of wheel support devices 15 and 15 of identical construction are mounted on the front and rear ends of the vehicle body 13, respectively. Each wheel support device 15 comprises a base 17 having a vertical shaft 18 extending upwardly therefrom. The vehicle body 13 has a pair of mounting portions 19 and 19 formed on the underside of the base portion 13a of the vehicle body 13 adjacent to the front and rear ends thereof. Each mounting portion 19 has a guide hole 19a formed therethrough. The shaft 18 slidably extends through the guide hole 19a, the shaft 18 having an enlarged head 18a at its upper end which serves as a retaining means for preventing the shaft 18 from becoming withdrawn from the mounting portion 19. A free wheel 20 is attached to the base 17 through a thrust bearing 21, the free wheel 20 being in the form of a caster rotatable about a vertical axis. A resilient means 23 in the form of a compression coil spring is wound around the vertical shaft 18 and interposed between the base 17 and the mounting portion 19. The lower end of the coil spring 23 is held in engagement with the base 17, and the upper end is held in contact with a support plate 24 which is held against the mounting portion 19, the shaft 18 slidably extending through the support plate 24.

Figure 5:
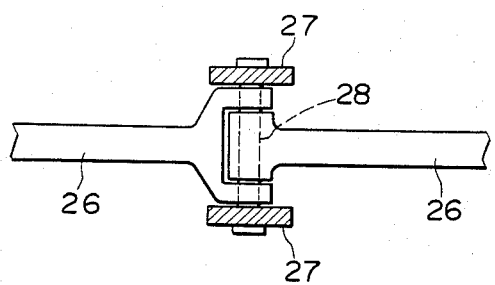
FIG. 5 is a fragmentary cross-sectional view taken along the line V—V of FIG. 3.

The base 17 has an integral support portion 25 extending laterally therefrom in parallel relation to the floor 12. A pair of horizontally-extending arms 26 and 26 are fixedly secured at their one ends to the respective bases 17 and 17, and the other ends of the arms 26 and 26 are pivotally connected to a pair of parallel spaced mounting plates 27 and 27 depending from the base portion 13a of the vehicle body 13 at the center of the vehicle body 13. As best shown in FIG. 5, the other end of the left-hand arm 26 is bifurcated and received in the spaced mounting plates 27 and 27, and the other end of the right-hand arm 26 is fitted in this bifurcated end of the left-hand arm 26. These other ends of the two arms 26 and 26 are connected together by a horizontal pivot pin 28 extending therethrough, the pivot pin 28 being supported by the two mounting plates 27 and 27 at its opposite ends. With this construction, the two arms 26 and 26 are pivotal about the pivot pin 28.

A route detector 29 for detecting the guide wire 11 and a marking detector 30 for detecting sensible markings 31 along the guide path 11 are fixedly secured to the underside of the support portion 25 of the base 17, the guide wire 11 and the sensible markings 31 being embedded in the floor 12. The markings 31 are positioned, for example, at stations along the guide path 11 where the guided vehicle 10 is programmed to stop. The guide vehicle 10 comprises a steering means (not shown) responsive to a signal from the route detector 29 for steering the guide vehicle to keep it on the guide path, a motor (not shown) for driving the drive wheels 14 and 14, and a program control device (not shown) for applying a signal to a motor drive circuit to drive the guided vehicle in a programmed manner.

As described above, the front and rear free wheels 20 and 20 are attached to the vehicle body 13 through the coil springs 23 and 23 of the wheel support devices 15 and 15, so that even when the guided vehicle 10 rides over roughened surfaces on the floor 12, a shock developed can be suitably absorbed to enable all the four wheels 14 and 20 to be held in positive engagement with the floor 12. Thus, since the drive wheels 20 are always held against the floor 12 under a sufficient pressure during the travelling of the guided vehicle 10, the guided vehicle 10 can be properly driven to move along the guide path 11. Also, since the front and rear ends of the guided vehicle 10 are resiliently supported by the wheel support devices 15 and 15 comprising the respective coil springs 23 and 23, the vehicle body 13 is angularly moved or swung vertically about the drive wheels 20 and 20 during the travelling of the guided vehicle 10. However, the detectors 29 and 30 are attached to the support portion 25 of the base 17 so that these detectors 29 and 30 are maintained substantially at a constant height relative to the floor 12 and therefore the guided wire 11 and the sensible markings 31 regardless of the vertical angular movement of the vehicle body 13 about the drive wheels 14 and 14. Therefore, the detection of the guided wire 11 and the sensible markings 31 is always made accurately by the respective detectors 29 and 30 so that the guided vehicle 10 can be properly operated in a programmed manner.

Figure 6:
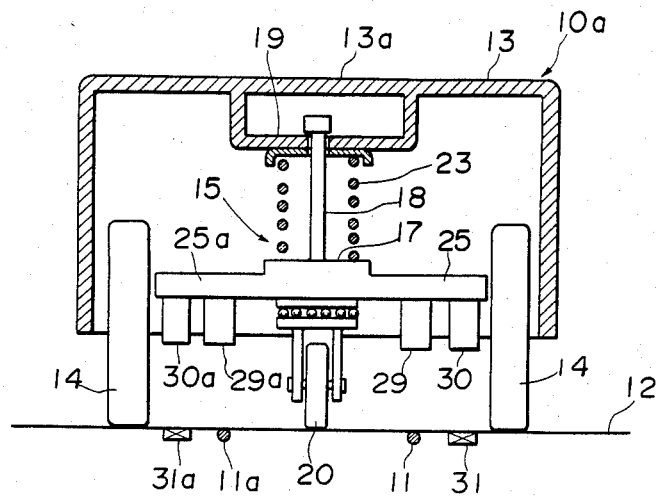
FIGS. 6 to 9 are views similar to FIG. 4 but showing modified guided vehicles, respectively.

FIG. 6 shows a modified guided vehicle 10a which differs from the guided vehicle 10 of FIGS. 2 to 4 in that a second support portion 25a extends laterally from the base 17 in a direction away from the first support portion 25. A second route detector 29a for detecting another guide wire 11a and a second marking detector 30a for detecting additional sensible markings along the guide wire 11a are attached to the underside of the second support portion 25a. With this construction, the guided vehicle 10 can be moved into a branch route from a main route by detecting the guide wire of the branch route when the guided vehicle 10 comes to a branch point.

Figure 7:
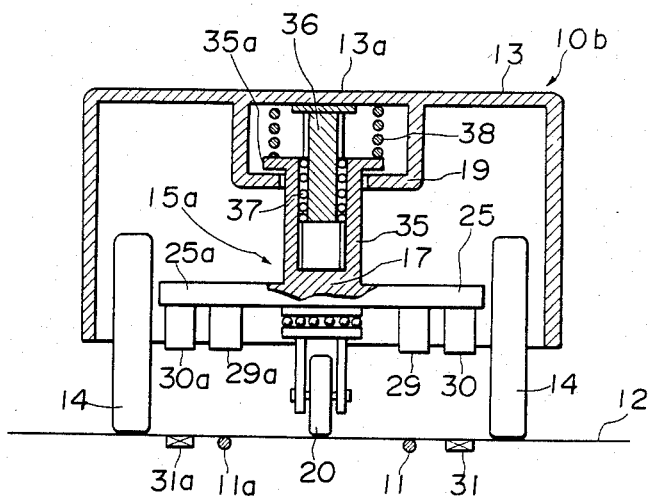

FIG. 7 shows another modified guided vehicle 10b which differs from the guided vehicle 10a of FIG. 6 in that a wheel support device 15a has a ball-spline mechanism and that the arms 26 and 26 are not provided. A spline hub 35 extends upwardly from the base 17 and slidably extends through the mounting portion 19, the spline hub 35 having at its upper end a flange 35a which serves as a retaining means for preventing the spline hub 35 from becoming withdrawn from the mounting portion 19. A vertically-disposed spline shaft 36 is fixedly secured to the underside of the base portion 13a of the vehicle body 13. The spline shaft 36 is received in the spline hub 35 for movement therealong, balls 37 being received in the hub 35. A compression coil spring 38 is wound around the spline shaft 36 and acts between the flange 35a of the spline hub 35 and the underside of the base portion 13a of the vehicle body 13. With this construction, the wheel support device 15a is resiliently mounted on the vehicle body 13. In this embodiment, the spline shaft 36 is fitted in the spline hub 35 for vertical movement therealong so that the wheel support device 15a is prevented from becoming inclined. This arrangement obviates the need for the arms 26 and 26 in the preceding embodiments.

Figure 8:
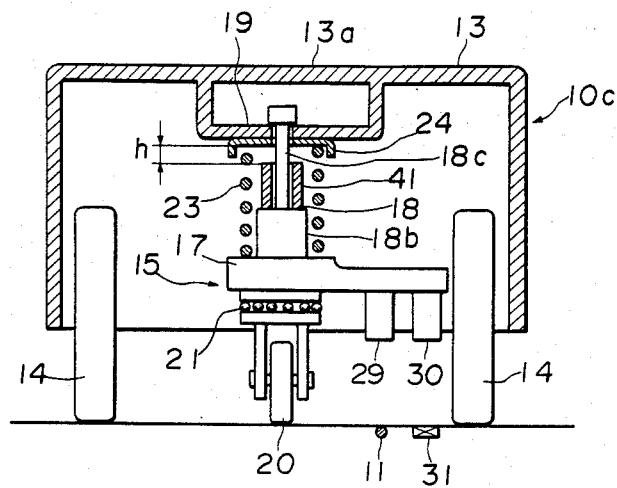

FIG. 8 shows a further modified guided vehicle 10c which differs from the guided vehicle 10 of FIGS. 2 to 4 in that an additional resilient means is incorporated in each wheel support device 15. The vertical shaft 18 has a proximal portion 18b of an enlarged diameter adjacent to the base 17. The additional resilient means 41 comprises a cylindrical hollow member made of resilient rubber which is fitted on the reduced-diameter portion 18c, the rubber member 41 being received within the coil spring 23 in concentric relation thereto. The lower end of the rubber member 41 is held against the upper end of the proximal portion 18b of the shaft 18, and the upper end of the rubber member 41 is disposed at a level below the upper end of the coil spring 23.

The coil spring 23 has such a spring constant that it can suitably be contracted when the guided vehicle 10 moves on roughened portions of the floor 12 to thereby absorb the shock developed. The rubber member 41 has a greater spring constant than the coil spring 23 has. The spring constants of the coil spring 23 and rubber member 41 are so predetermined that when the guided vehicle 10 is loaded with a rated load, the upper end of the rubber member 41 is spaced downwardly from the upper end of the coil spring 23 by a predetermined distance h.

While the guided vehicle 10c travels along the smooth flat surface of the floor 12, the distance between the upper ends of the rubber member 41 and the coil spring 23 are kept to the predetermined value h. When the guided vehicle 10c rides on a raised portion of the floor 12 or intrudes into an upwardly-sloping portion of the floor 12, a substantial force is applied to the coil spring 23 to contract it because the inertias of the body 13 and the goods thereon are large, so that only the wheel support device 15 is moved upwardly, with the central portion of the guided vehicle 10c hardly raised relative to the floor 12. For this reason, the drive wheels 14 and 14 are not raised away from the floor 12 and do not idle over the floor 12. Thus, the drive wheels 14 and 14 are always held in engagement with the floor 12 under a sufficient pressure to drive the guided vehicle to move. As described above, the spring constant of the coil spring 23 is relatively small so that it can be contracted when the guided vehicle 10c moves on the raised portions of the floor 12, thereby holding the drive wheels 14 and 14 in positive engagement with the floor 12.

As described above, during the travelling of the guided vehicle 10c, the central portion of the vehicle body 13 is hardly moved vertically relative to the floor 12, but the vehicle body 13 is angularly moved or swung vertically about the drive wheels 14 and 14 under the influence of the coil springs 23 and 23 so that the front and rear of the vehicle body 13 are moved upwardly and downwardly. When the front or the rear of the vehicle body 13 is moved downwardly by a distance exceeding the distance h between the upper ends of the coil spring 23 and the rubber member 41, the support plate 24 is brought into contact with the upper end of the rubber member 41. As described above, since the rubber member 41 has a relatively large spring constant, the rubber member 41 is slightly contracted at this time to resiliently resist against the downward angular movement of the vehicle body 13. Thus, the excessive angular movement of the vehicle body 13 is prevented not by a rigid abutting member but by the resilient rubber member 41, so that no substantial impact is applied to the vehicle body 13, thereby ensuring that the goods on the vehicle body 13 are kept in a stable manner.

Figure 9:
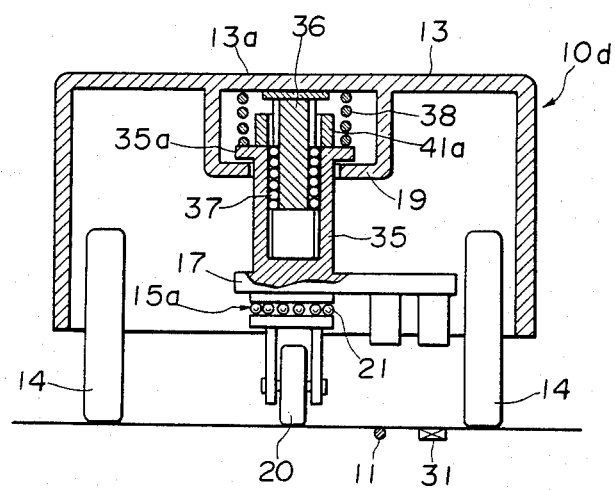

FIG. 9 shows a further modified guided vehicle 10d which differs from the guided vehicle 10b of FIG. 7 in that an additional resilient means is incorporated in each wheel support device 15a. The additional resilient means comprises a resilient rubber member 41a which is similar in construction to the rubber member 41 in the preceding embodiment of FIG. 8. The rubber member 41a is fitted on the spline shaft 36 and received within the coil spring 38. The lower end of the rubber member 41a is held against the flange 35a of the spline hub 35, and the upper end is disposed at a level below the upper end of the coil spring 38. The rubber member 41a performs the same function as the rubber member 41 of FIG. 8 does.

While the guided vehicles according to this invention have been specifically shown and described herein, the invention itself is not to be restricted by the exact showing of the drawings or the description thereof. For example, the coil spring may be replaced by any suitable resilient member such as a leaf spring and a resilient rubber member. Also, the cylindrical rubber member of FIGS. 8 and 9 may be replaced by a coil spring, a leaf spring or the like. However, it is preferred that the additional resilient means of FIGS. 8 and 9 comprises the resilient rubber member of a cylindrical shape as in the illustrated embodiments of FIGS. 8 and 9. The spring constant of the rubber member is advantageously increased as its deformation proceeds, so that the swinging movement of the vehicle body about the drive wheels is suitably limited to a predetermined degree. Further, in the embodiments of FIGS. 8 and 9, the two resilient members, i.e., the coil spring and the rubber member are used, but more than two resilient members may be used.

What is claimed is:

1. A driverless guided vehicle movable along a guide path on a floor which vehicle comprises:

(a) an elongated body including a pair of drive wheels disposed intermediate opposite ends thereof;

(b) a pair of wheel support devices mounted on the opposite ends of said body, respectively, each of said wheel support devices comprising a base supporting a driven wheel for rotation about a horizontal axis, and a coil spring interposed and acting between said body and said base for permitting vertical movement of said wheel support device relative to said body, said driven wheel being in the form of a caster rotatable about a vertical axis;

(c) a pair of arms extending horizontally along the length of said body and fixedly secured at their one ends to said bases, respectively;

(d) a mounting plate mounted on said body intermediate opposite ends thereof, said pair of arms being connected together at their other ends and pivotally mounted on said mounting plate by a horizontally-disposed pin extending through the other ends of said arms and said mounting plate; the axis of said pin being disposed in a vertical plane in which the axis of each drive wheel lies, and said vertical plane being disposed perpendicular to the longitudinal axis of said body; and (e) a detecting means for detecting the guide path and sensible markings along the guide path, said detecting means being mounted on one of said bases.

2. A driverless guided vehicle according to claim 1, in which a resilient member is mounted on said base in coaxial relation to said coil spring and normally spaced from said body, said resilient member having a greater spring constant than said coil spring.

3. A driverless guided vehicle according to claim 1, in which said body has a mounting portion, a shaft projecting upwardly from said base and extending slidably through said mounting portion, said shaft having at its upper end a retaining portion for preventing said shaft from becoming withdrawn from said mounting portion, and said coil spring being mounted around said shaft and interposed between said base and said mounting portion.

* * * * *